(12) United States Patent
Weiss et al.

(10) Patent No.: US 10,584,021 B2
(45) Date of Patent: Mar. 10, 2020

(54) LOAD CENTERING DEVICES AND METHODS FOR A MATERIAL HANDLING VEHICLE

(71) Applicant: THE RAYMOND CORPORATION, Greene, NY (US)

(72) Inventors: Joseph Andrew Weiss, Greene, NY (US); Robert Paterson, Binghamton, NY (US); Boris Trifunovic, Greene, NY (US)

(73) Assignee: The Raymond Corporation, Greene, NY (US)

( * ) Notice: Subject to any disclaimer, the term of this patent is extended or adjusted under 35 U.S.C. 154(b) by 0 days.

(21) Appl. No.: 15/093,062

(22) Filed: Apr. 7, 2016

(65) Prior Publication Data
US 2016/0297655 A1    Oct. 13, 2016

Related U.S. Application Data (60) Provisional application No. 62/144,565, filed on Apr. 8, 2015.

(51) Int. Cl.
*B66F 9/14* (2006.01)
*B62B 3/06* (2006.01)

(52) U.S. Cl.
CPC ............ *B66F 9/142* (2013.01); *B62B 3/0612* (2013.01); *B62B 3/0618* (2013.01); *B62B 3/0625* (2013.01)

(58) Field of Classification Search
CPC ....... B62B 3/06; B62B 3/0612; B62B 3/0618; B62B 3/0625; B62B 2203/28; B62B 2203/29; B66F 9/14; B66F 9/142; B66F 9/143; B66F 9/18; B66F 9/183
USPC ........................................ 414/622, 623, 785
See application file for complete search history.

(56) References Cited

U.S. PATENT DOCUMENTS

| | | | | | |
|---|---|---|---|---|---|
| 2,211,499 | A | * | 8/1940 | Fontaine | ................... B66C 1/24 294/63.1 |
| 2,468,999 | A | * | 5/1949 | Pettler | ..................... B66F 9/183 414/623 |
| 2,509,023 | A | * | 5/1950 | Vogel | ..................... B66F 9/183 414/621 |
| 2,519,282 | A | * | 8/1950 | Priester | ................... B66F 9/188 294/63.1 |
| 2,527,103 | A | * | 10/1950 | Noack | ....................... B66C 1/24 414/623 |
| 2,530,375 | A | * | 11/1950 | Cartwright | .............. B66F 9/188 294/63.1 |
| 2,656,062 | A | * | 10/1953 | Thomas | .................. B66F 9/195 294/207 |

(Continued)

FOREIGN PATENT DOCUMENTS

| CN | 2519838 Y | 11/2002 |
|---|---|---|
| CN | 1867494 A | 11/2006 |

(Continued)

OTHER PUBLICATIONS

European Search Report, EP16164268; dated Apr. 10, 2016.

*Primary Examiner* — James Keenan
(74) *Attorney, Agent, or Firm* — Quarles & Brady LLP (57) ABSTRACT

Load centering devices and methods for a material handling vehicle are provided. In particular, load centering devices and methods are provided that enable a load to be centered with respect to load carrying forks on a material handling vehicle when the load is raised and/or lowered by the forks.

10 Claims, 12 Drawing Sheets

(56) References Cited

U.S. PATENT DOCUMENTS

| | | | | |
|---|---|---|---|---|
| 2,690,271 A * | 9/1954 | Marietta | ............... | B66F 9/184 |
| | | | | 414/623 |
| 2,709,016 A * | 5/1955 | Schenkelberger | ...... | B66F 9/188 |
| | | | | 414/623 |
| 2,735,564 A * | 2/1956 | Bickerstaff | ............ | B66F 9/188 |
| | | | | 294/87.1 |
| 2,761,579 A * | 9/1956 | Bickerstaff | ............ | B66F 9/188 |
| | | | | 294/63.1 |
| 2,822,206 A * | 2/1958 | MacKenzie | ............... | B66C 1/32 |
| | | | | 294/63.1 |
| 2,983,397 A * | 5/1961 | Hirschboeck | ........... | B66F 9/188 |
| | | | | 414/623 |
| 3,002,639 A * | 10/1961 | Cavanagh | ............... | B66F 9/188 |
| | | | | 414/623 |
| 3,493,137 A * | 2/1970 | Nilsen | ....................... | B66F 9/18 |
| | | | | 294/115 |
| 4,726,729 A * | 2/1988 | Olson | ..................... | B62D 1/28 |
| | | | | 294/907 |
| 4,751,983 A | 6/1988 | Leskovec et al. | | |
| 4,906,159 A | 3/1990 | Sobo et al. | | |
| 5,026,245 A * | 6/1991 | Sabo | ........................ | B66F 9/18 |
| | | | | 414/785 |
| 5,082,413 A * | 1/1992 | Grosz | .................. | A01D 87/126 |
| | | | | 294/119.1 |
| 5,208,753 A | 5/1993 | Acuff | | |
| 5,812,395 A | 9/1998 | Masciangelo et al. | | |
| 6,241,453 B1 | 6/2001 | Upmeyer | | |
| 6,611,746 B1 | 8/2003 | Nagai | | |
| 6,713,750 B2 | 3/2004 | Goddard | | |
| 6,730,861 B1 | 5/2004 | Simons | | |
| 7,544,037 B2 | 6/2009 | Haverfield et al. | | |
| 8,755,929 B2 * | 6/2014 | McKernan | ............... | B66F 9/20 |
| | | | | 700/213 |
| 9,260,125 B2 * | 2/2016 | Ellington | ................ | B62B 3/06 |

FOREIGN PATENT DOCUMENTS

| | | |
|---|---|---|
| CN | 203715198 U | 7/2014 |
| DE | 9309543.0 | 6/1993 |
| EP | 2251298 A1 | 11/2010 |
| EP | 2336075 A1 | 6/2011 |
| JP | 3132418 B2 * | 2/2001 ................ B66F 9/12 |

* cited by examiner

LOAD CENTERING DEVICES AND METHODS FOR A MATERIAL HANDLING VEHICLE

CROSS-REFERENCES TO RELATED APPLICATIONS

The present application is based on, claims priority to, and incorporates herein by reference in its entirety, U.S. Provisional Patent Application No. 62/144,565, filed Apr. 8, 2015, and entitled "Load Centering Devices and Methods for a Material Handling Vehicle."

STATEMENT REGARDING FEDERALLY SPONSORED RESEARCH

Not Applicable.

BACKGROUND

The present invention relates to material handling vehicles. More particularly, the invention relates to load centering devices and methods for a material handling vehicle.

Material handling vehicles are commonly found in warehouses, factories, shipping yards, and, generally, wherever pallets, large packages, or loads of goods are required to be transported from place to place. Material handling vehicles typically include load bearing forks for lifting packages or pallets for transporting, an electric drive motor for propelling the truck, a steering control mechanism, and a brake.

To improve productivity and reduce certain costs, material handling vehicles have been designed to include sensing features that allow them to be an automatic guided vehicle (AGV). An AGV may be programmed to store travel routes and include a control system which is integrated with the drive, steering, and braking systems for the vehicle. Among other reasons, sensing or locating features may be included in an AGV to detect the presence of an object to be lifted, as well as its position and orientation.

When a material handling vehicle transporting a load or object is in motion, an operator can monitor the position of the load to avoid obstacles or other objects. In AGV applications, however, an unknown position of the load requires an extended width of an object detection field to include the maximum amount the load could shift to either side of the center of the forks. Devices are available which clamp the end of a pallet closest to the operator, providing a known position of the pallet on the clamped end. These devices are manually actuated by the operator and secure the pallet on one end.

An AGV's object detection system must stop the vehicle before contact with an object. As a result, the object detection field must be wide enough to cover the vehicle and the load. Most AGVs do not change their trajectory to compensate for inexactly placed loads, however. In another situation, AGVs are used in a semi-autonomous mode where an operator performs the loading operation, and then the vehicle can perform a given task. In both cases, the vehicle does not qualify how well the pallet is loaded or its location on the forks.

From a perfectly centered position, typical pallets can shift about 4 inches to either side and still be successfully loaded. This uncertainty of knowing where the load sits on the forks results in the object detection field being wider than it needs to be. This increases the frequency of nuisance stops, or false alarms, and in other cases the additional object detection field width may prevent the vehicle from operating in potential applications. Traditional pallet clamps that only fix the pallet's location at one end do not solve the problem of securing the pallet in a known location because the far end of the pallet is free to shift laterally in a skewed fashion.

Additionally, automated systems can only accommodate variability within a specified tolerance. When one automated system interfaces with another, each has the potential to add a small amount of variability to the operation. This is added on top of any variability the system was passed from an upstream process. These tolerances accumulate (tolerance stacking) and can cause out-of-specification placement at a pickup and drop off station.

Therefore, it is an object of the invention to provide an industrial material handling vehicle that overcomes the aforementioned problems.

SUMMARY OF THE INVENTION

The present invention provides devices and methods for a material handling vehicle that allow for sensing or manipulation of the position of a load such that the material handling vehicle can avoid obstacles and other objects, and more accurately load and unload pallets.

In one aspect, the present invention provides a method for centering a load on a material handling vehicle. The material handling vehicle includes a pair of forks configured to receive the load and a pair of arms each moveably coupled to one of the pair of forks. The pair of arms are each configured to actuate with respect to the pair of forks. The method includes positioning the material handling vehicle adjacent to the load such that the pair of forks are positioned within the load, and instructing the material handling vehicle to raise the pair of forks. The method further includes upon the instructing the material handling vehicle to raise the pair of forks, actuating the pair of arms to engage the load thereby centering the load with respect to the pair of forks.

In some aspects, actuating the pair of arms to engage the load includes providing pressurized fluid to a lift actuator to actuate a lift piston within a lift cylinder and, upon actuation of the lift piston, mechanically actuating a load centering fixture coupled to the pair of arms and the lift piston.

In some aspects, actuating the pair of arms to engage the load includes providing pressurized fluid to both a lift actuator and a load centering actuator and, upon pressurized fluid entering the lift actuator and the load centering actuator, actuating a load centering piston of the load centering actuator coupled to the pair of arms.

In some aspects, the method further includes once the pair of arms center the load, controlling a contact force provided by the pair of arms engaging the load.

In some aspects, controlling the contact force provided by the pair of arms engaging the load includes providing a compliance spring through which a load centering fixture coupled to the pair of arms is actuated.

In some aspects, controlling the contact force provided by the pair of arms engaging the load includes sensing the contact force provided by the pair of arms engaging the load, and limiting the sensed contact force to be less than a contact force limit, when the pair of arms engage the load.

In some aspects, the method further includes instructing the material handling vehicle to lower the pair of forks and, upon instructing the material handling vehicle to lower the pair of forks, actuating the pair of arms to disengage the load.

In some aspects, actuating the pair of arms to disengage the load includes inhibiting pressurized fluid from flowing to a lift actuator, opening a control valve to provide fluid communication between the lift actuator and a tank and, upon fluid communication being provided between the lift actuator and the tank, actuating a lift piston of the lift actuator coupled to the pair of arms.

In some aspects, actuating the pair of arms to disengage the load includes inhibiting pressurized fluid from flowing to a lift actuator and a load centering actuator, opening a control valve to provide fluid communication between the lift actuator and the load centering actuator and a tank and, upon fluid communication being provided between the load centering actuator and the tank, actuating a load centering piston of the load centering actuator coupled to the pair of arms.

In another aspect, the present invention provides a material handling vehicle including a body, a fork carriage coupled to the body and including a pair of forks configured to carry a load, and a pair of arms each moveably coupled to one of the pair of forks. The pair of arms are each configured to actuate with respect to the pair of forks. The material handling vehicle further includes a hydraulic circuit including a lift actuator coupled to the pair of forks. Actuation of the lift actuator in a first direction raises the pair of forks and actuation of the lift actuator in a second direction lowers the pair of forks. When the pair of forks are raised by the lift actuator, the pair of arms actuate to engage the load carried by the pair of forks to center the load with respect to the pair of forks.

In some aspects, when the pair of forks are lowered by the lift actuator, the pair of arms actuate to disengage the load carried by the pair of forks.

In some aspects, the lift actuator includes a lift piston coupled to a load centering fixture and the load centering fixture is coupled to the pair of arms.

In some aspects, the load centering fixture extends through a compliance spring to compensate for a size of the load.

In some aspects, the material handling vehicle further includes a load actuator arranged in parallel with the lift actuator.

In some aspects, the load centering actuator includes a load centering piston slidably received within a load centering cylinder and coupled to the pair of arms.

In some aspects, the load centering cylinder includes a return spring arranged therein to retract the load centering piston.

In some aspects, the material handling vehicle further includes a control valve arranged between the load centering actuator and a tank to selectively provide fluid communication between the lift actuator and the load centering actuator and the tank.

In some aspects, the material handling vehicle further includes a relief valve arranged between a fluid source and a tank to maintain a pressure provided by the fluid source below a fluid source pressure limit when the pair of arms engage the load.

In some aspects, the material handling vehicle further includes at least one force gauge to measure a contact force provided by the pair of arms when the pair of arms engage the load.

The foregoing and other aspects and advantages of the invention will appear from the following description. In the description, reference is made to the accompanying drawings which form a part hereof, and in which there is shown by way of illustration embodiments of the invention. Such embodiments do not necessarily represent the full scope of the invention, however, and reference is made therefore to the claims and herein for interpreting the scope of the invention

DESCRIPTION OF DRAWINGS

The invention will be better understood and features, aspects and advantages other than those set forth above will become apparent when consideration is given to the following detailed description thereof. Such detailed description makes reference to the following drawings

DETAILED DESCRIPTION OF THE INVENTION

Figure 1:
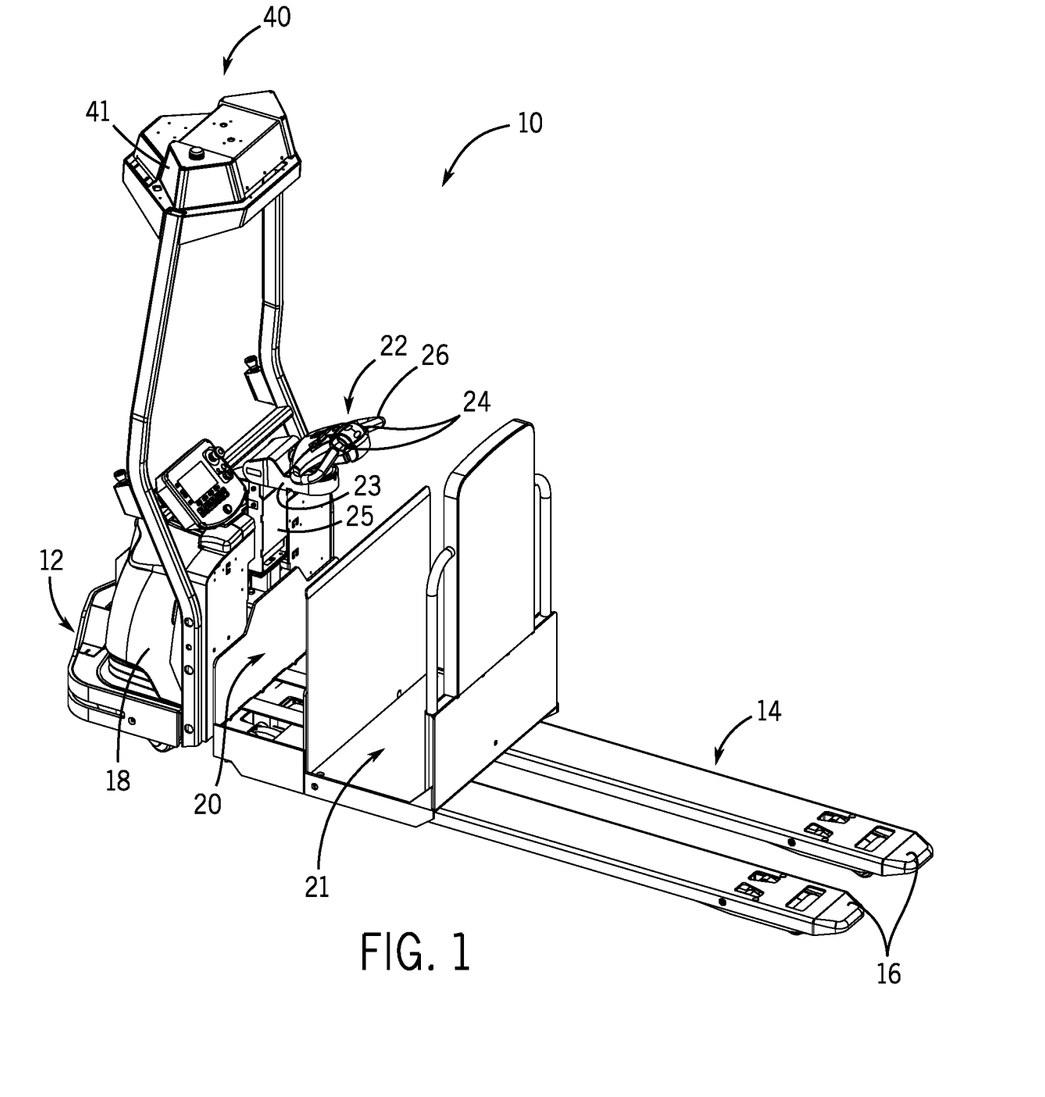
FIG. 1 is a perspective view of a material handling vehicle according to one aspect of the present invention.
Figure 2:
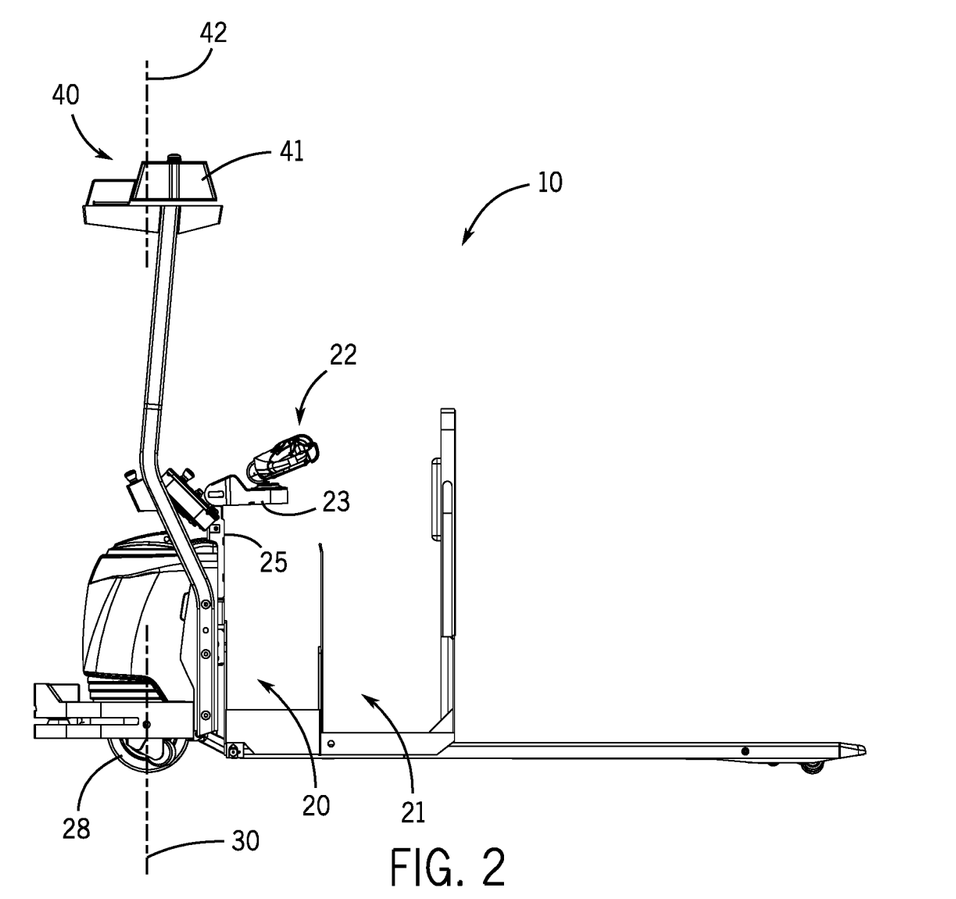
FIG. 2 is a side view of the material handling vehicle of FIG. 1.

Referring to FIGS. 1 and 2, a material handling vehicle 10 embodying an aspect of the invention is shown. The material handling vehicle 10 can include a body 12, a fork carriage 14 with at least one load bearing fork 16, a motor compartment 18 housing a motor (not shown), a battery compartment 20 for housing a battery (not shown), and an operator compartment 21. The material handling vehicle 10 can also include a steering mechanism 22. The steering mechanism 22 can be coupled to the body 12 of the vehicle through connection to a horizontal arm weldment 23 and a stalk 25. The steering mechanism 22 can include a steering handle 26 and a throttle control 24. Manipulation of the throttle control 24 can send a signal to control the throttle of the material handling vehicle 10. The steering mechanism 22 can be coupled to a steerable drive wheel 28 that can include a steering axis 30.

The material handling vehicle 10 may also include one or more locating apparatuses 40 that allow the vehicle 10 to be an automatic guided vehicle (AGV). For example, specific types of locating apparatuses 40 include, but are not limited to, cameras, geographic positioning systems (GPS), rotating laser scanners, and motion sensors. The locating apparatus 40 provides sensing and/or navigation capabilities to automatically guide the material handling vehicle 10, however, the fact that a material handling vehicle 10 has one or more such locating apparatuses 40 does not necessarily make the vehicle 10 an AGV. For example, a material handling vehicle 10 may include a GPS such that the location of that vehicle 10 is known and recorded as part of a fleet management system. The locating apparatus 40 can define a locating axis 42 that may serve as a datum or reference for various calculations that may be necessary for computing the sensing features of the locating apparatus 40 and for carrying out corresponding actions of the material handling vehicle 10. As illustrated in FIG. 2, the locating axis 42 need not be centered with respect to the locating apparatus 40. The locating axis 42 can be aligned with and/or defined by a central axis of a piece of equipment of the locating apparatus 40, such as a camera.

Figure 3:
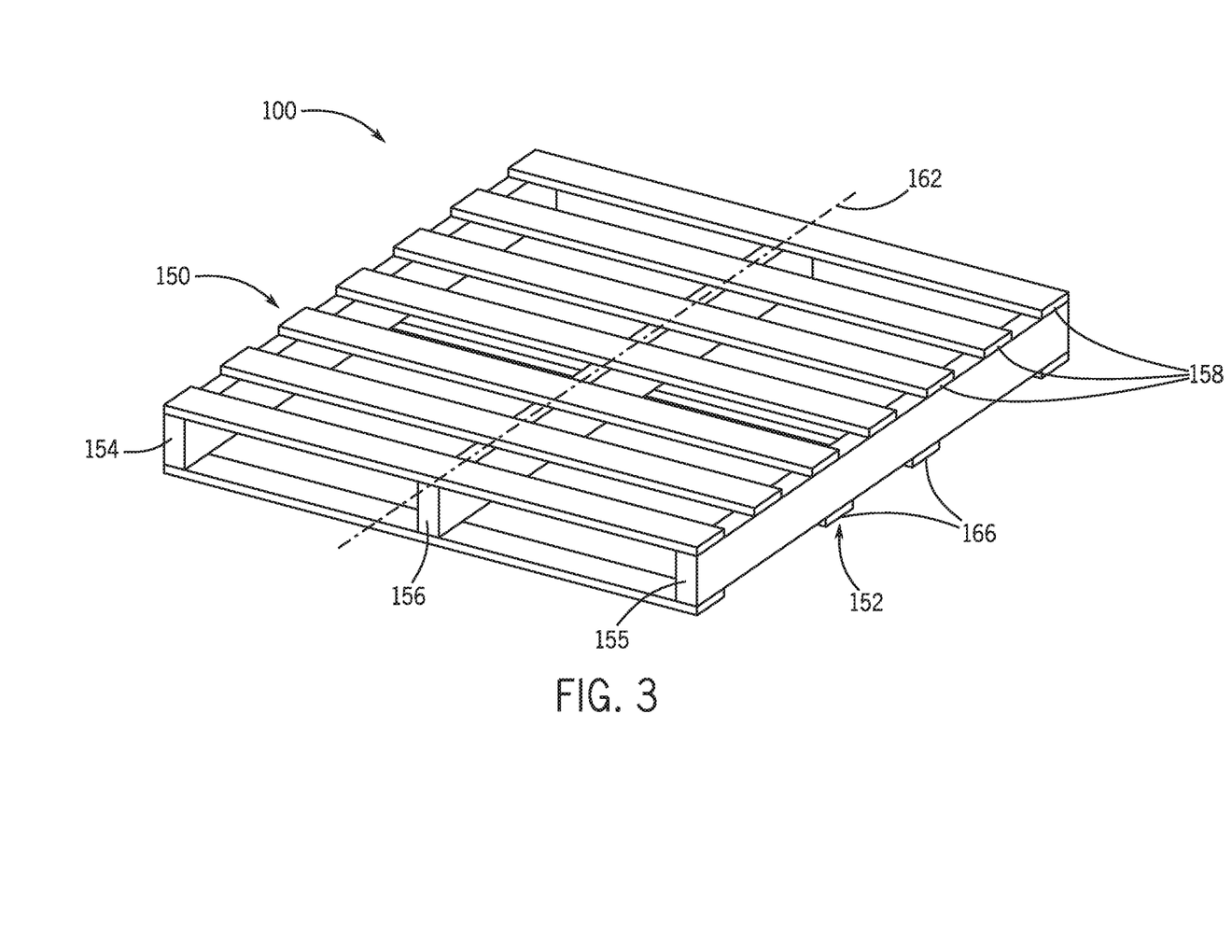
FIG. 3 is a schematic of an example of a pallet usable with the invention.

In some embodiments, the load bearing forks 16 are configured to move a load 100, for example, a pallet. Generally, as can be seen in FIG. 3, the load 100 can be made up of an upper deck 150, a lower deck 152, first and second lateral stringers 154 and 155, and center stringer 156. Both lateral stringers 154 and the center stringer 156 can be configured to connect the upper deck 150 and lower deck 152. The upper deck 150 can be made up of a plurality of longitudinally extending spaced apart members 158 each coupled to the first and second lateral stringers 154 and 155 and the center stringer 156. The lower deck 152 can be made up of a plurality of longitudinally extending spaced apart members 166 each coupled to an opposing side of the first and second lateral stringers 154 and 155 and the center stringer 156. The load 100 can define a center axis 162 defined along the center stringer 156.

Figure 4A:
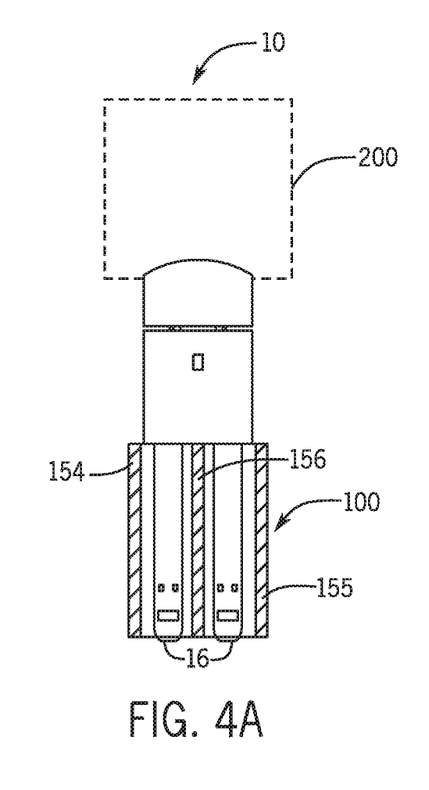
FIG. 4A is a schematic of an example initial position of a loaded pallet where the loaded pallet is centered.
Figure 4B:
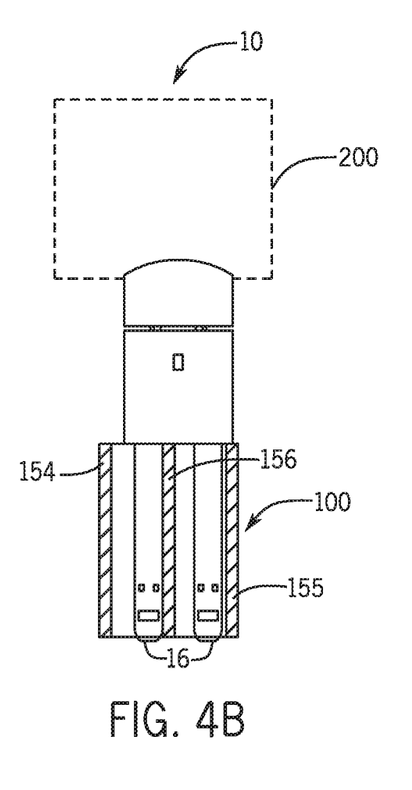
FIG. 4B is a schematic of an example initial position of a loaded pallet where the loaded pallet is offset to the left.
Figure 4C:
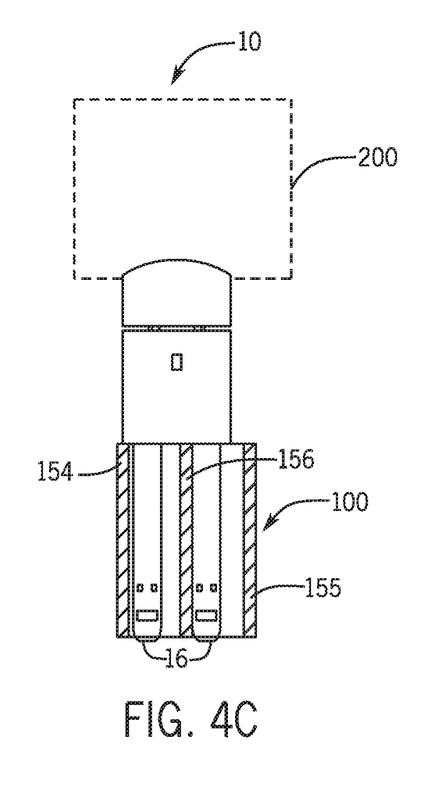
FIG. 4C is a schematic of an example initial position of a loaded pallet where the loaded pallet is offset to the right.

In operation, the material handling vehicle 10 can be maneuvered manually, remotely, and/or autonomously, to travel to the load 100. Once the material handling vehicle 10 reaches the load 100, the material handling vehicle 10 can position one of the forks 16 between the center stringer 156 and the first lateral stringer 154 and the other of the forks 16 between the center stringer 156 and the second lateral stringer 155. The material handling vehicle 10 can then lift and transport the load 100, as desired. During this operation, due to a clearance between the forks 16 and the space between the central stringer 156 and the first and second lateral stringers 154 and 155, the load 100 can be in one of a plurality of positions on the forks 16. For example, the load 100 may be generally centered with respect to the forks 16, as shown in FIG. 4A. That is, the center axis 162 can be equidistant from an inner surface of the forks 16. In some non-limiting examples, when the load 100 may be generally centered, the center axis 162 of the load 100 can be aligned with and/or intersect the locating axis 42. In other non-limiting examples, as shown in FIGS. 4B and 4C, the load 100 may be shifted either left (FIG. 4B) or right (FIG. 4C) with respect to the forks 16.

When the load 100 is shifted to the left or right, the material handling vehicle 10 may require an increased object detection field 200 in the direction of the shift can be noticed. Additionally or alternatively, when the load 100 is shifted to the right or left, the material handling vehicle 10 may not be able to take a desired travel path, as the travel path may be designed with tolerances that closely accommodate a material handling vehicle 10 with a centered load. It would therefore be desirable to have a material handling vehicle with a device that can center the load 100 with respect to the forks 16 and thereby enable the material handling vehicle 10 to know the position of the load 100 during loading events.

Figure 5A:
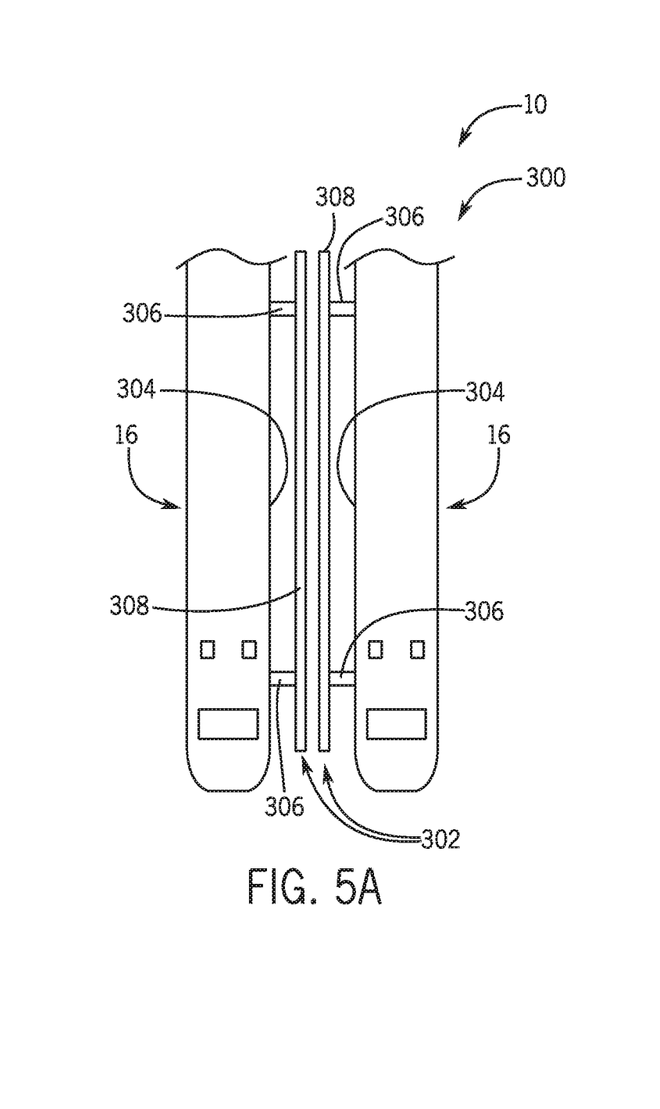
FIG. 5A is schematic of a load centering device utilizing a pair of arms according to one aspect of the present invention.

In one non-limiting example, the material handling vehicle 10 can include a load centering device 300 configured to manipulate the load 100 such that the load 100 is centered with relation to the forks 16. As can be seen in FIG. 5A, the load centering device 300 can include a pair of arms 302 each coupled to an inner surface 304 the forks 16. The arms 302 are configured to clamp the center stringer 156 of the load 100 thereby creating a contact force between the arms 302 and center stringer 156. The contact force causes the load 100 to be centered with respect to the forks 16 and enables the material handling vehicle 10 to know the position of the load 100.

The arms 302 can each include at least one coupling member 306 and a contacting member 308 configured to contact the center stringer 156 of the load 100. In one non-limiting example, an aperture (not shown) on the inner surfaces 304 of each in the forks 16 can be configured to receive the coupling members 306. In this non-limiting example, when the material handling vehicle 10 is not in use or is in motion without the load 100, the coupling members 306 can be drawn into the aperture such that the contacting members 308 can be in contact with the inner surfaces 304 of the forks 16. When the material handling vehicle 10 is receiving a load 100, a piston-like actuation can force the coupling members 306 out of the aperture such that the contacting members 308 place a contacting force on the center stringer 156.

Figure 5B:
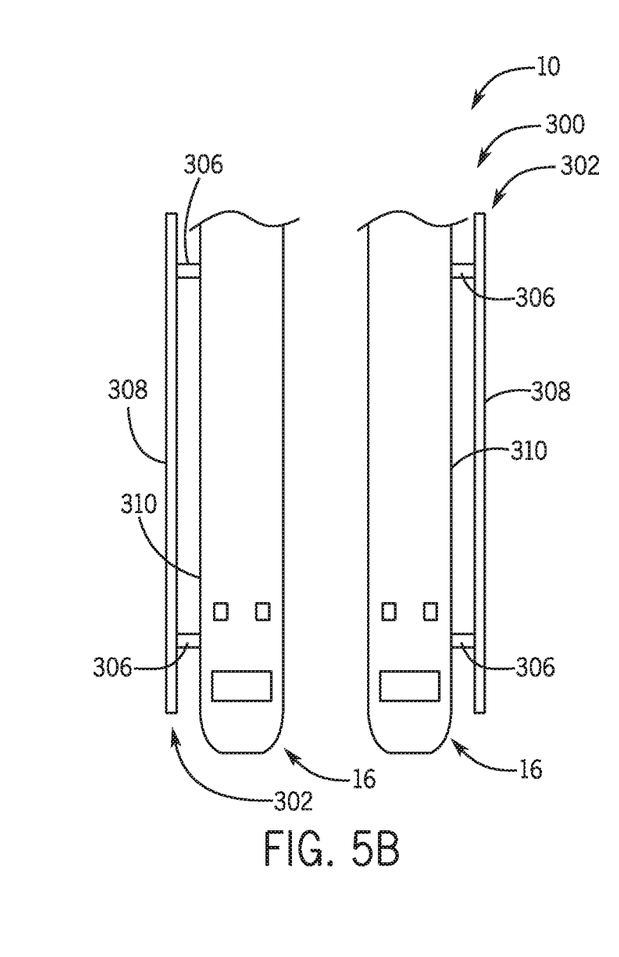
FIG. 5B is a schematic of a load centering device utilizing a pair of arms according to another aspect of the present invention.

In another non-limiting example, the pair of arms 302 of the load centering device 300 can each be coupled to an outer surface 310 of the forks 16, as shown in FIG. 5B. In this non-limiting example, the arms 302 can be configured to provide a contact force on the first and second lateral stringers 154 and 156 of the load 100. The contact force provided by the arms 302 can cause the load 100 to be centered with respect to the forks 16 and enables the material handling vehicle 10 to know the position of the load 100.

Figure 5C:
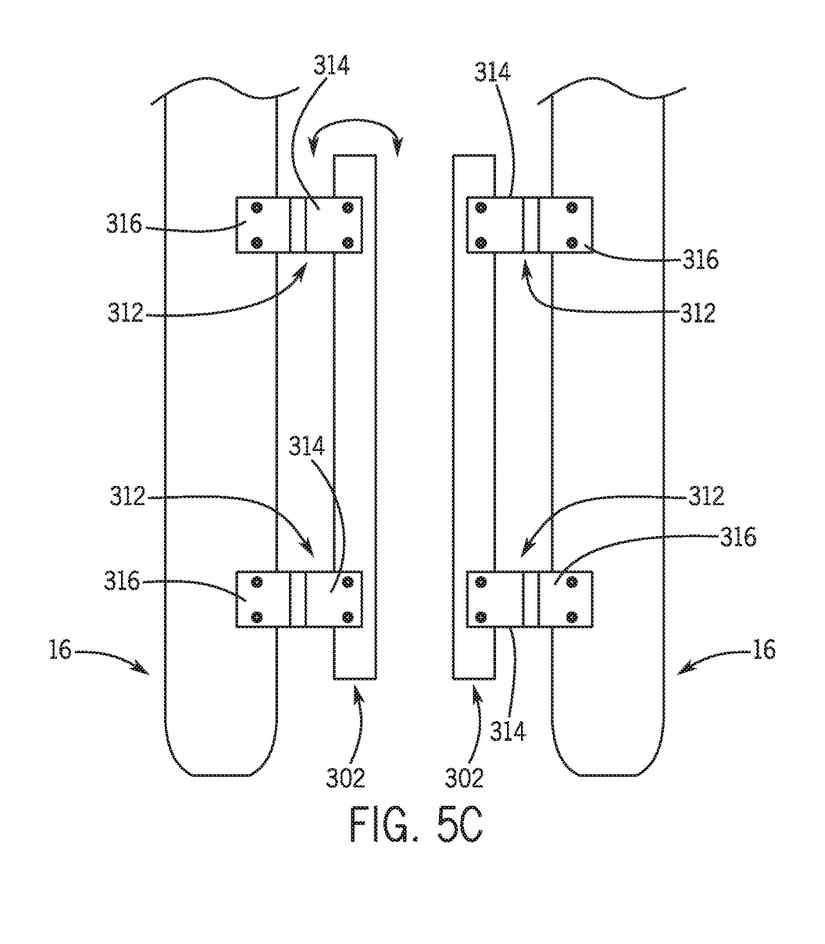
FIG. 5C is a schematic of a load centering device utilizing a pair of hinged arms according to one aspect of the present invention.

In yet another non-limiting example, the arms 302 of the load centering device 300 can be coupled to the forks 16 via one or more hinges 312. As shown in FIG. 5C, a first wing 314 of the hinges 312 can be coupled to the arms 302 and a second wing 316 of the hinges 312 can be coupled to the forks 16. In this non-limiting example, the arms 302 can be rotatable about the hinges 312 in response to an actuating force. The actuating force can be provided to the arms 302, for example, when the material handling vehicle 10 is about to receive the load 100. It should be appreciated that although the illustrated hinges 312 are coupled to the forks 16 to enable the arms 302 to contact the center stringer 156 of the load 100, in other non-limiting examples, the hinges 312 may be coupled to the forks 16 to enable to arms 302 to contact the first and second lateral stringers 154 and 155 of the load 100.

Figure 6A:
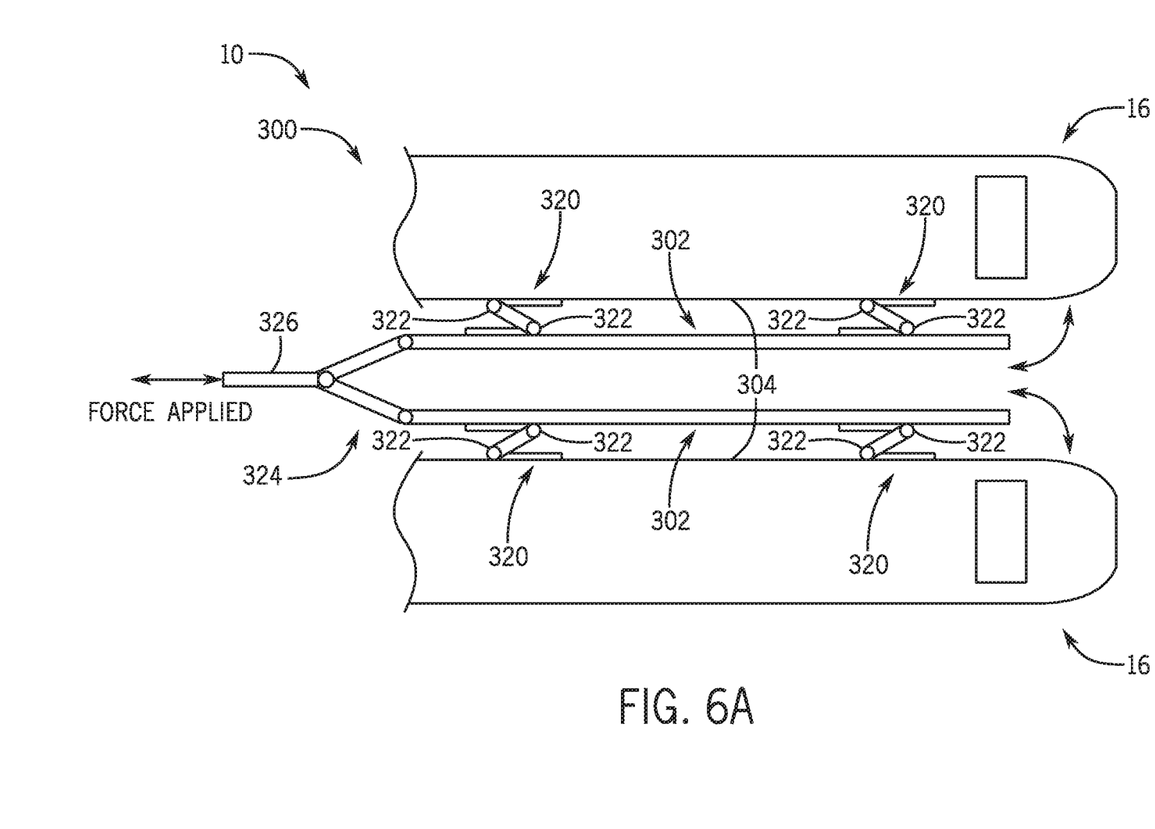
FIG. 6A is a schematic of a load centering device utilizing a pair of moveable arm mechanisms according to one aspect of the present invention.
Figure 6B:
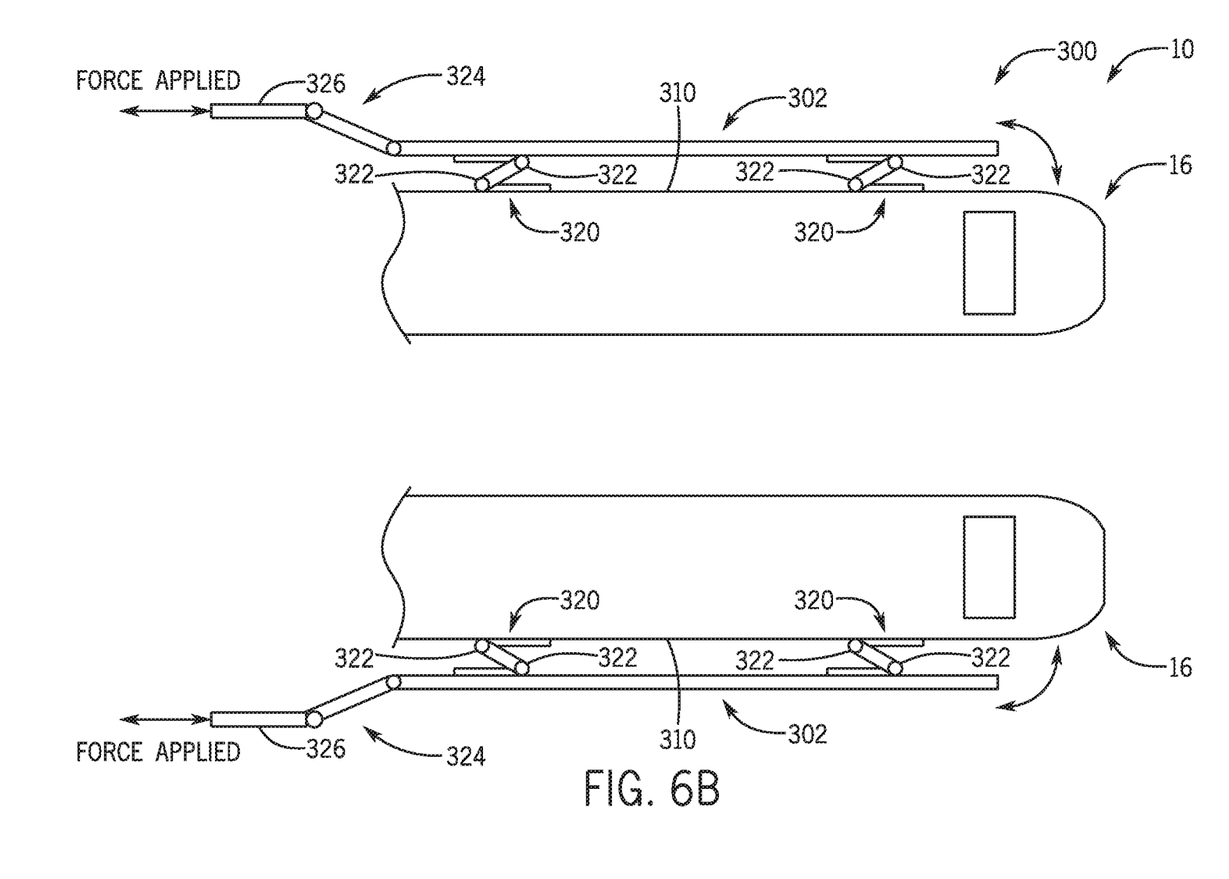
FIG. 6B is a schematic of a load centering device utilizing a pair of moveable arm mechanisms according to another aspect of the present invention.

Turning to FIGS. 6A and 6B, in other non-limiting examples, the arms 302 of the load centering device 300 may be coupled to the forks 16 by at least one coupling linkage 320. Each of the coupling linkages 320 can includes one or more hinges 322 to enable the coupling linkages 320 to moveably couple the arms to the forks 16. The arms 302 can be coupled to an input linkage 324 having an input member 326. An input force applied to the input member 326 in a desired direction can actuate the arms 302 to either contact and center the load 100 or to release the load 100. In the non-limiting example of FIG. 6A, the coupling linkages 320 can moveably couple the arms 302 to the inner surface 304 of the forks 16 to enable the arms 302 to clamp on the center stringer 156 and center the load 100. In the non-limiting example of FIG. 6B, the coupling linkages 320 can moveably couple the arms 302 to the outer surface 310 of the forks 16 to enable the arms 302 to contact the first and second lateral stringers 154 and 155 and center the load 100.

In any of the non-limiting examples of FIGS. 5A-6B, described above, the arms 302 may be selectively moveable to engage, or contact, the load 100 during centering and subsequently disengage the load 100. In some non-limiting example, the selective actuation of the arms 302 to center the load 100 may be coupled to the action of raising or lowering the forks 16. In one non-limiting example, such selective actuation of the arms 302 can be achieved by coupling the arms 302 to a hydraulic system of the material handling vehicle 10. The hydraulic system of the material handling vehicle 10 can provide the motive force to lift and lower the forks 16 and the load centering device 300 can harness a portion of this force to selectively actuate the arms 302 and couple this actuation with the raising and/or lowering of the forks 16.

Figure 7A:
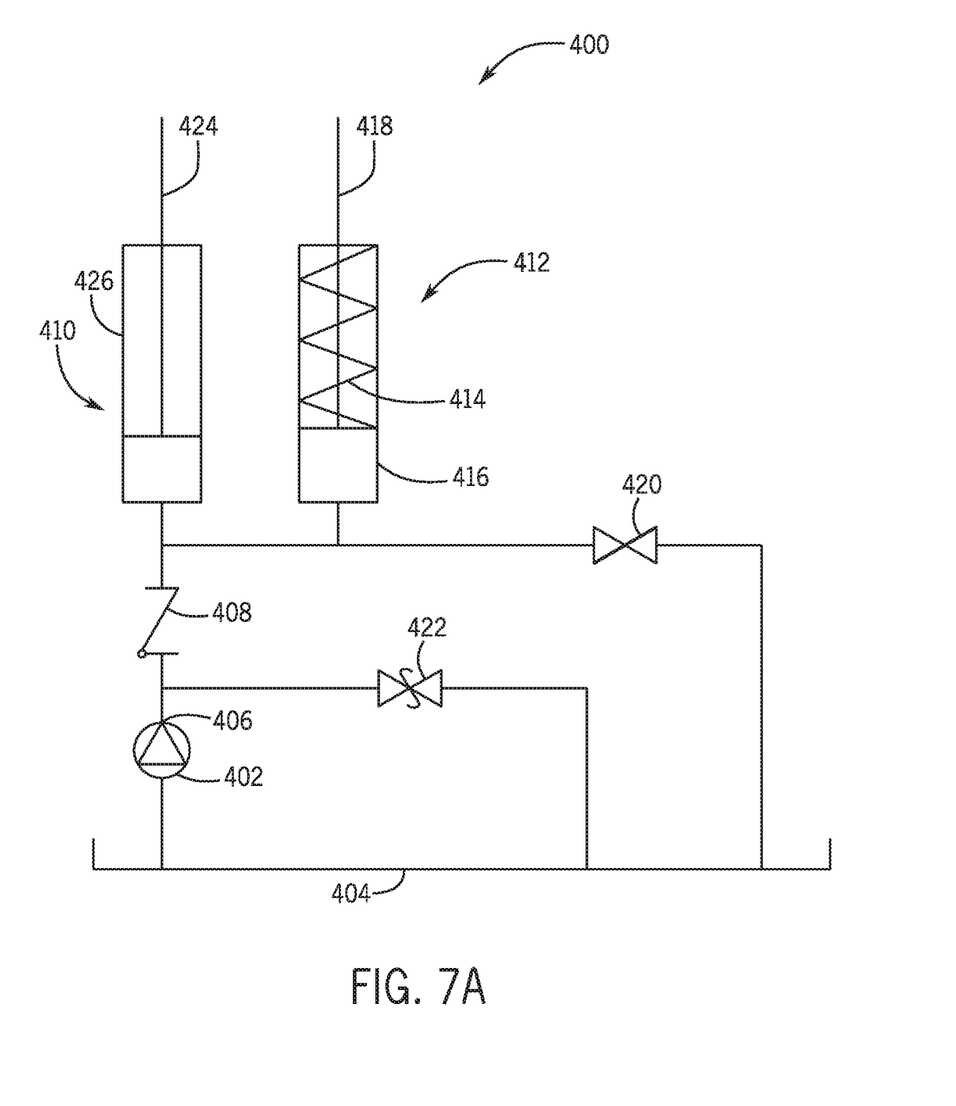
FIG. 7A is schematic of a hydraulic circuit for coupling to a load centering device according to one aspect of the present invention.

FIG. 7A shows one non-limiting example of a hydraulic circuit 400 of the material handling vehicle 10 configured to couple to the load centering device 300 for selective centering of the load 100. The hydraulic circuit 400 can include a pump 402 configured to draw hydraulic fluid (e.g., oil) from a tank 404 and furnish the hydraulic fluid under increased pressure at a pump outlet 406. A check valve 408 is arranged downstream of the pump 402 and can be configured to only allow fluid to flow from the pump outlet 406 to either a lift actuator 410 or a load centering actuator 412. The illustrated lift actuator 410 and load centering actuator 412 can be arranged in parallel and can both be in the form of a piston cylinder. Additionally, the load centering actuator 412 can be a spring return piston cylinder where a return spring 414 arranged with a load centering cylinder 416 can provide a restorative force. This restorative force can cause a load centering piston 418, slidably received within the load centering cylinder 416, to return to an original position (shown in FIG. 7A) once a control valve 420 is opened (i.e., the control valve 420 enables fluid to flow from the load centering actuator 412 to the tank 404). The control valve 420 can be arranged downstream of both of the lift actuator 410 and the load centering actuator 412, and can be selectively opened and closed, for example, by an electronic control unit (ECU) (not shown) of the material handling vehicle 10. A relief valve 422 can be arranged to provide fluid communication between a location between the pump outlet 406 and the check valve 408 and the tank 404. The relief valve 422 can be configured to relieve excess pressure once the pressure at the pump outlet 406 exceeds a predetermined pressure. Similar to the load centering actua-
tor 412, the lift actuator 410 can include a lift piston 424 slidably received within a lift cylinder 426.

In operation, the material handling vehicle 10 can be positioned such that the forks 16 engage the load 100 (i.e., one fork can be arranged between the first lateral stringer 154 and the center stringer 156 and another fork can be arranged between the second lateral stringer 155 and the center stringer 156). The material handling vehicle 10 can then lift the load 100 by raising the forks 16 for transporting the load. To raise the forks 16, the ECU on the material handling vehicle 10 can instruct the pump 402 to supply hydraulic fluid from the tank 404 through the check valve 408 to both the lift actuator 410 and the load centering actuator 412. Pressure from the hydraulic fluid, generated by the pump 402, can force both the load centering piston 418 and the lift piston 424 to extend from their respective cylinders 416 and 426. The extension of the lift piston 424 can cause the forks 16 to raise (i.e., displace in a direction away from the ground the material handling vehicle 10 is traveling on). The substantially simultaneous extension of the load centering piston 418 can provide a force on the arms 302 in a desired direction to either clamp the arms 302 onto the center stringer 156 of the load 100 or contact the first and second lateral stringer 154 and 155 to center the load with respect to the forks 16. In the non-limiting examples of FIGS. 6A and 6B, the load centering actuator 412 can be coupled to the input member 326. In this non-limiting example, actuation of the load centering piston 418 can cause the input member 326 to force the arms 302 to actuate in a desired direction, via the coupling linkages 320 and input linkages 324, to center the load 100 on the forks 16.

Once the load 100 has been engaged and centered by the arms 100, the material handling vehicle 10 can know a location of the load 100 with respect to the locating axis 42 and, therefore, can more efficiently travel when transporting the load 100. That is, the frequency of the object detection field width preventing the material handling vehicle 10 from operating in potential applications may be reduced. Additionally, once the load 100 is engaged and centered by the arms 302, excess pressure above a predetermined level, generated by the pump 402, can be bled to the tank 404 through the relief valve 422.

Once the material handling vehicle 10 reaches a desired location to deposit the load 100, since the load 100 is centered, the material handling vehicle 100 can better position the load 100, for example, on a rack. To deposit the load 100, the ECU on the material handling vehicle 10 can instruct the pump 402 to cease supplying pressurized fluid to the lift actuator 410 and the load centering actuator 412. The check valve 408 can prevent fluid flow from either of the lift actuator 410 and the load centering actuator 412 to the pump 404 or the relief valve 422. Thus, the pressurized fluid will remain in the lift cylinder 426 and the load centering cylinder 416 until the control valve 420 is opened thereby provided a fluid path between the lift actuator 410 and the load centering actuator 412 and the tank 404. The ECU can selectively instruct the control valve 420 to open to enable pressurized fluid to flow from the lift cylinder 426 and the load centering cylinder 416 to the tank 404.

A weight provided by the load 100 on the forks 16 and a weight of the forks 16 themselves can force the fluid out of the lift cylinder 426 through the check valve 420 and to the tank 404. When this occurs, the lift piston 424 can retract back into the lift cylinder 426 thereby lowering the forks 16. Substantially simultaneously, the return spring 414 within the load centering cylinder 416 can retract the load centering piston 418 into the load centering cylinder 416 and force the fluid within the load centering cylinder 416 through the control valve 420 and to the tank 404. The retraction of the load centering piston 418 can actuate the arms 302 such that the arms 302 disengage the load 100 and enable the material handling vehicle 10 to deposit the load 100 at the desired location. Once the load 100 is disengaged, a clearance between the forks 16 and the center stringer 156 of the load can be maximized and the material handling vehicle 10 can effectively deposit the load 100 and continue on to perform another desired task.

Figure 7B:
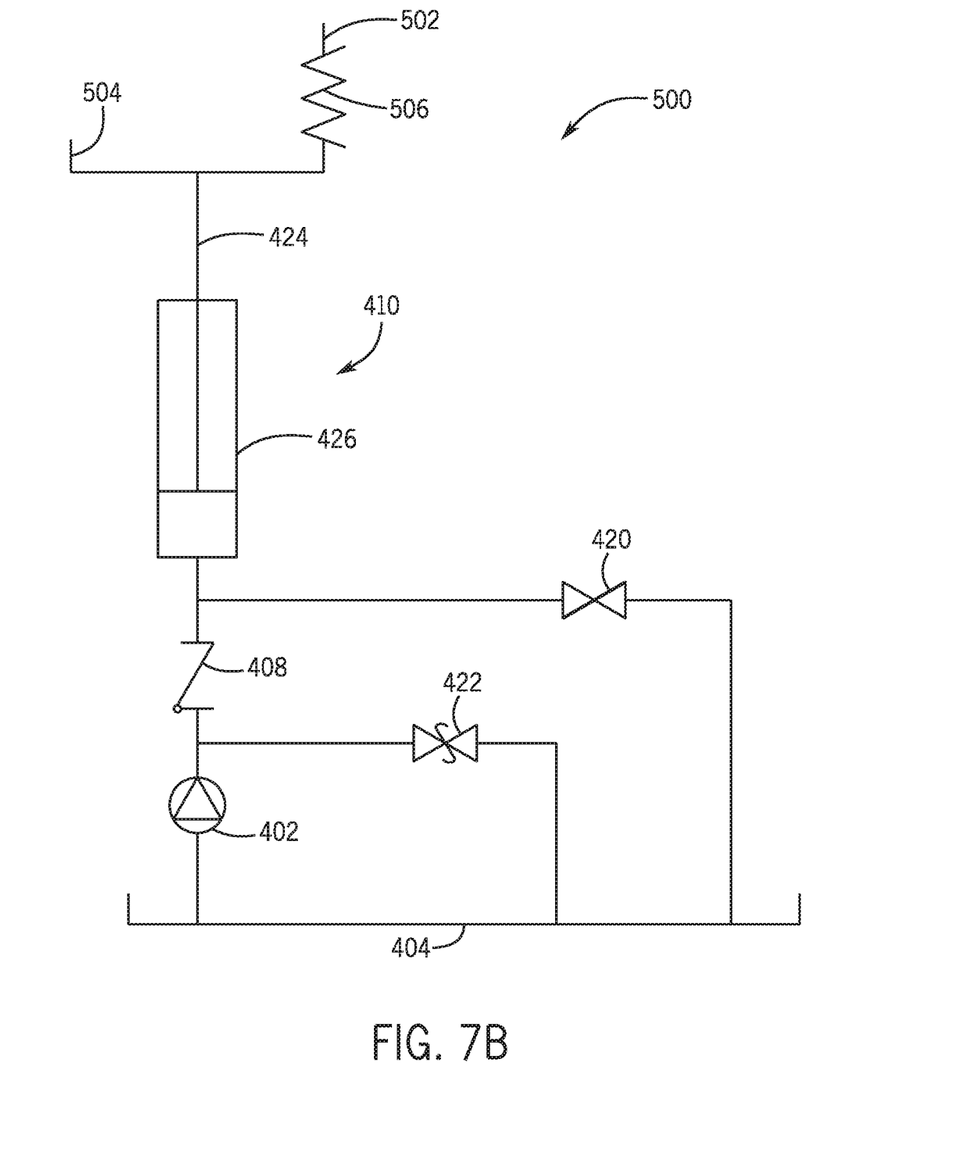
FIG. 7B is a schematic of a hydraulic circuit for coupling to a load centering device according to another aspect of the present invention.

FIG. 7B shows another non-limiting example of a hydraulic circuit 500 of the material handling vehicle 10 configured to couple to the load centering device 300 for selective centering of the load 100. The hydraulic circuit 500 can be similar to the hydraulic circuit 400, with like features identified using similar reference numerals, except as described below or apparent from FIG. 7B. As shown in FIG. 7B, the hydraulic circuit 500 does not include the load centering actuator 412 but instead includes a load centering fixture 502 and pull rods 504 each mechanically coupled to the lift piston 424. The load centering fixture 502 can be coupled to the arms 302 for actuating the arms 302 in a desired direction to center the load 100. The load centering fixture 502 can be coupled to a compliance spring 506.

In operation, when the material handling vehicle 10 is instructed to raise the forks 16, pressurized fluid can be supplied to the lift actuator 410 causing the lift piston 424 to extend from the lift cylinder 426. As the lift piston 424 is actuated, the pull rods 504 can be actuated thereby raising the forks 16. Substantially simultaneously, the load centering fixture 502 can be actuated through the compliance spring 506 thereby actuating the arms 302 in a desired direction to engage and center the load 100. The actuation of the load centering fixture 502 through the compliance spring 506 allows for varying width center stringers to be clamped without arresting motion of the pull rods 504. In the non-limiting examples of FIGS. 6A and 6B, the load centering fixture 502 can be coupled to the input member 326. In this non-limiting example, actuation of the load centering fixture 502 can cause the input member 326 to force the arms 302 to actuate in a desired direction, via the coupling linkages 320 and input linkages 324, to center the load 100 on the forks 16.

In other non-limiting examples, a separate system can be added to the material handling vehicle 10 to power the load centering device 300, for example, an electric motor, a separate hydraulic system, and the like.

In each of the non-limiting examples for coupling the load centering device 300 to the material handling vehicle 10 for selective centering of the load 100, provisions can be made to control the movement of the arms 302 to allow adequate force to be applied to the load 100 while allowing for loads of varying stringer widths. As described above in the non-limiting example of FIG. 7B, the compliance spring 506 can be used to allow for some compliance between the motive force provided by the lift piston 424 and the arm 302. In other non-limiting examples, at least one force gauge can be added to the arms 302 to measure an engaging force applied to the load 100. In these non-limiting examples, logic can be added to the ECU to limit the engaging force and/or stop motion of the arms 302 when an engaging force limit is reached or force readings from both opposing arms 302 can be equal.

Figure 8A:
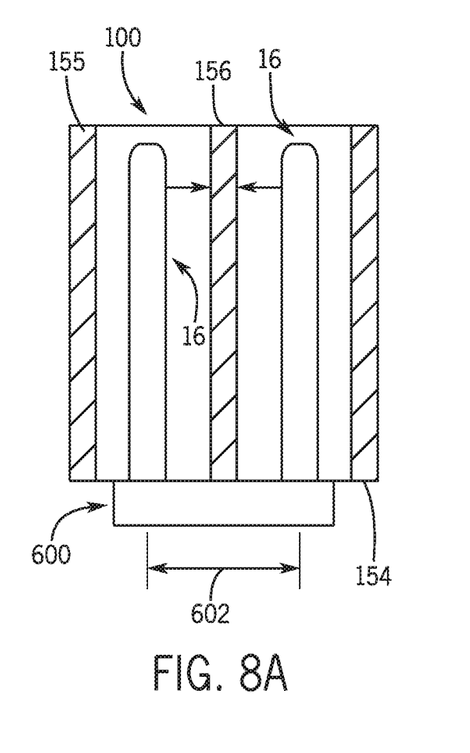
FIG. 8A is a schematic of a load centering device utilizing moveable forks with the moveable forks in a first position according to one aspect of the present invention.
Figure 8B:
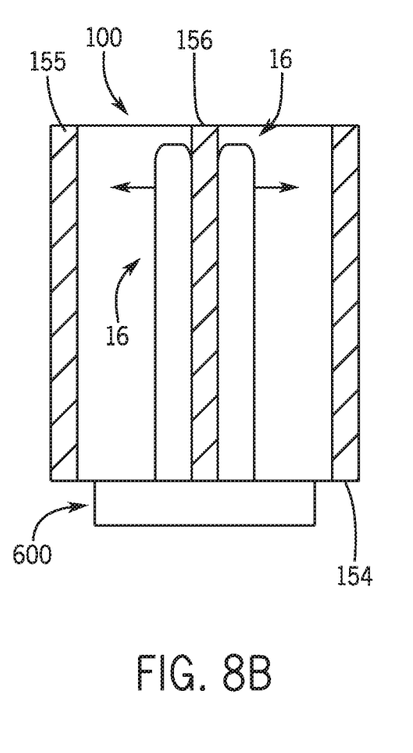
FIG. 8B is a schematic of the load centering device of FIG. 8A with the moveable forks in a second position.
Figure 8C:
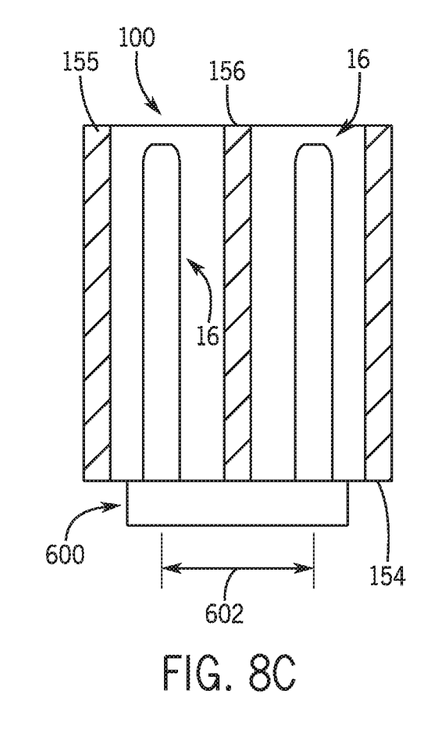
FIG. 8C is a schematic of the load centering device of FIG. 8A with the moveable forks in the first position and a load centered.

FIGS. 8A-8C show another non-limiting example of a load centering device 600 configured to selectively center the load 100 with respect to the forks 16. The load centering device 600 can be configured to move the forks 16 with respect to the load 100. As shown in FIG. 8A, the forks 16 can be placed within the load 100 at an initial width, 602, with the forks 16 placed between the respective lateral stringers 154 and 155 and center stringer 156. Following the initial placement of the forks 16, the load 100 can be lifted such that the forks 16 place a contacting force on the upper deck of the load 100. The forks 16 can then be actuated such that the forks 16 move laterally inward to clamp the center stringer 156, as shown in FIG. 8B. It can also be possible for the forks 16 to move laterally outward until the forks 16 contact the first and second lateral stringers 154 and 155. Through this movement of the forks 16, the load 100 can become centered with respect the forks 16 and the material handling vehicle 10 can know a position of the load 100.

After centering the load, the load 100 can be returned to its resting position such that the contact force between the forks 16 and the upper deck is removed. The load centering device 600 can again be actuated to return the forks 16 to their original width, 602, as can be seen in FIG. 8C. By repositioning the forks 16, the load 100 can be adjusted to display a centered position with respect to the material handling vehicle 10.

Figure 9:
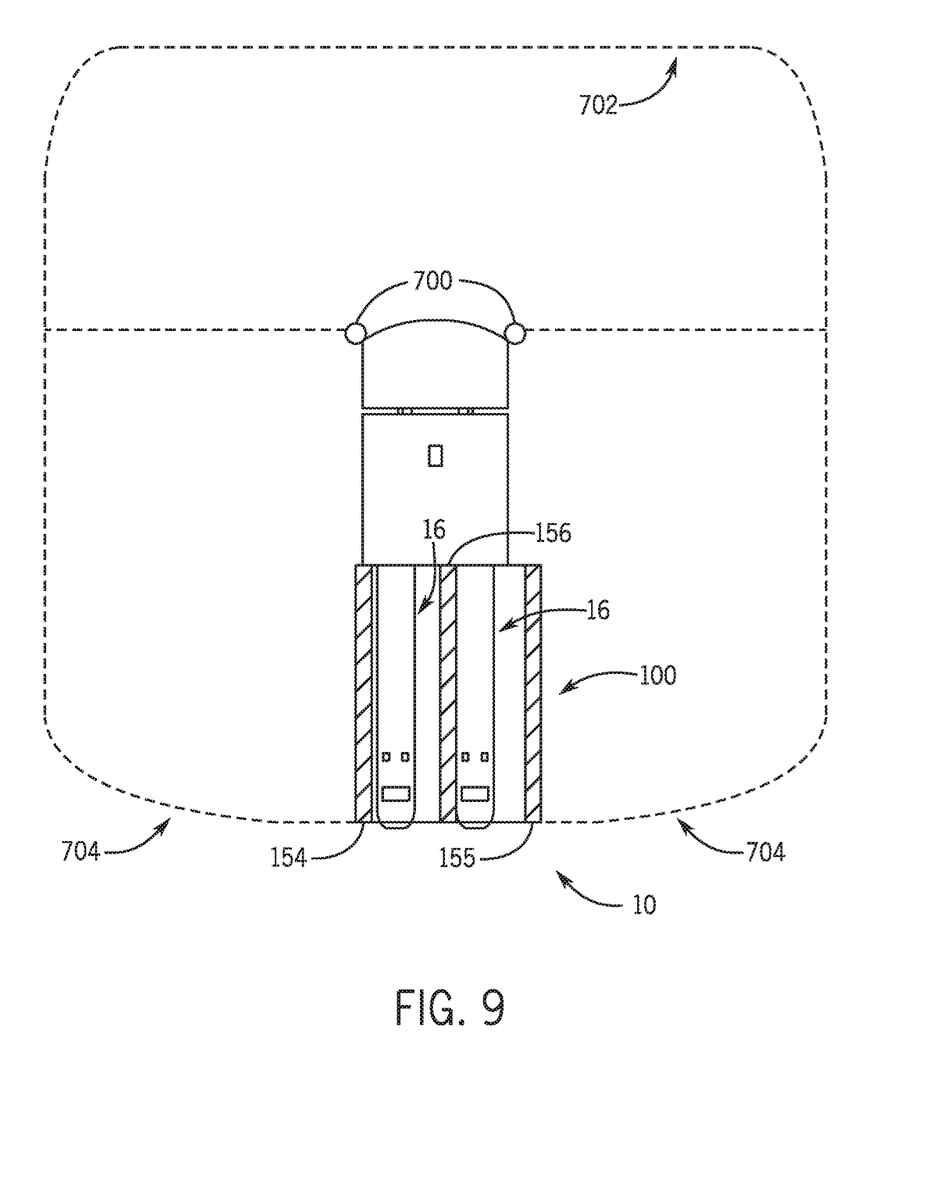
FIG. 9 is a schematic of a load centering device utilizing passive sensing according to one embodiment of the present invention.

FIG. 9 shows another non-limiting example of the material handling vehicle 10, where the material handling vehicle 10 may not be configured to selectively center the load 100 but, instead, be configured to detect a position of the load 100 with respect to the material handling vehicle 10 and adjust an object detection field accordingly. As shown in FIG. 9, the material handling vehicle 10 can include one or more sensors 700 arranged at a suitable location on the material handling vehicle 10 such that an object detection field 702 can be defined. The sensors 702 can each have a detection range 704, which can allow each sensor 702 to measure a position of a load 100 carried by the material handling vehicle 10. The position of the load 100 measured by the sensors 702 can then be communicated to a control unit of the material handling vehicle 10 and the object detection field 702 can be adjusted to accommodate the exact position of the load 100.

The detecting of the load 100 position by the sensors 702 can be achieved by utilizing mechanical sensors configured to contact the load 100, or by utilizing non-contact sensors such as laser, vision, ultrasonic, or the like. In the illustrated example of FIG. 9, the position of the first and second lateral stringers 154 and 155 can be measured, and the load 100 may have a known offset to the right. The object detection field 702 can then be extended on the right only to compensate for the lateral shift. In an alternative non-limiting example, if the material handling vehicle 10 is equipped with side shifting forks (not shown), the load 100 may be side shifted to center the load 100 relative to the vehicle's travel path. If the material handling vehicle 10 is not equipped with side shifting forks, the material handling vehicle 10 may adjust its travel path to center the load 100 and prevent the creation of obstacle zones.

Within this specification embodiments have been described in a way which enables a clear and concise specification to be written, but it is intended and will be appreciated that embodiments may be variously combined or separated without parting from the invention. For example, it will be appreciated that all features described herein are applicable to all aspects of the invention described herein.

Thus, while the invention has been described in connection with particular embodiments and examples, the invention is not necessarily so limited, and that numerous other embodiments, examples, uses, modifications and departures from the embodiments, examples and uses are intended to be encompassed by the claims attached hereto. The entire disclosure of each patent and publication cited herein is incorporated by reference, as if each such patent or publication were individually incorporated by reference herein.

Various features and advantages of the invention are set forth in the following claims.

We claim:

1. A method for centering a load on a material handling vehicle, the material handling vehicle including a pair of forks configured to receive the load and a pair of arms each moveably coupled to one of the pair of forks, the pair of arms are each configured to actuate with respect to the pair of forks, the method comprising:
   directly connecting a load centering hydraulic actuator of the material handling vehicle to the pair of arms, wherein the load centering hydraulic actuator is arranged in parallel with a lift hydraulic actuator;
   positioning the material handling vehicle adjacent to the load such that the pair of forks are positioned within the load;
   supplying fluid to the load centering hydraulic actuator and the lift hydraulic actuator, thereby raising the pair of forks, and
   actuating, via the load centering hydraulic actuator, the pair of arms to engage the load, thereby centering the load with respect to the pair of forks;
   instructing the material handling vehicle to lower the pair of forks;
   upon instructing the material handling vehicle to lower the pair of forks, actuating the pair of arms to disengage the load; and
   wherein actuating the pair of arms to disengage the load comprises inhibiting pressurized fluid from flowing into the lift hydraulic actuator and the load centering hydraulic actuator,
   opening a control valve to provide fluid communication between the lift hydraulic actuator and the load centering hydraulic actuator and a tank, and
   upon fluid communication being provided between the load centering hydraulic actuator and the tank, actuating a load centering piston of the load centering hydraulic actuator coupled to the pair of arms.

2. The method of claim 1, further comprising:
   once the pair of arms center the load, controlling a contact force provided by the pair of arms engaging the load.

3. The method of claim 2, wherein controlling the contact force provided by the pair of arms engaging the load comprises:
   sensing the contact force provided by the pair of arms engaging the load; and
   limiting the sensed contact force to be less than a contact force limit, when the pair of arms engage the load.

4. The method of claim 1, wherein actuating a load centering piston of the load centering hydraulic actuator coupled to the pair of arms comprises:
   biasing the load centering piston with a spring arranged within a load centering cylinder of the load centering hydraulic actuator.

5. A material handling vehicle comprising:
   a body;
   a fork carriage coupled to the body and including a pair of forks configured to carry a load;
   a pair of arms each moveably coupled to one of the pair of forks, wherein the pair of arms are each configured to actuate with respect to the pair of forks;
   a hydraulic circuit including a load centering hydraulic actuator directly connected to the pair of arms and a lift hydraulic actuator arranged in parallel with the load centering hydraulic actuator, wherein the hydraulic circuit is configured to selectively supply fluid to the load centering hydraulic actuator and the lift hydraulic actuator to raise the pair of forks in a first direction and to actuate the pair of arms to engage the load carried by the pair of forks to center the load with respect to the pair of forks; and
   wherein the load centering hydraulic actuator includes a load centering piston slidably received within a load centering cylinder and coupled to the pair of arms.

6. The material handling vehicle of claim 5, wherein when the pair of forks are actuated in a second direction from a raised position, the pair of arms actuate to disengage the load carried by the pair of forks.

7. The material handling vehicle of claim 5, wherein the load centering cylinder includes a return spring arranged therein to retract the load centering piston.

8. The material handling vehicle of claim 5, further comprising a control valve arranged between the load centering hydraulic actuator and a tank to selectively provide fluid communication between the lift hydraulic actuator and the load centering hydraulic actuator and the tank.

9. The material handling vehicle of claim 5, further comprising a relief valve arranged between a fluid source and a tank to maintain a pressure provided from the fluid source below a fluid source pressure limit when the pair of arms engage the load.

10. The material handling vehicle of claim 5, further comprising at least one force gauge to measure a contact force provided by the pair of arms when the pair of arms engage the load.

* * * * *